US012743295B2

(12) United States Patent
Dai et al.

(10) Patent No.: US 12,743,295 B2
(45) Date of Patent: Sep. 22, 2026

(54) VIRTUAL MACHINE MEMORY MANAGEMENT METHOD BASED ON VIRTUAL PCIe DEVICE

(71) Applicant: MONTAGE TECHNOLOGY CO., LTD., Shanghai (CN)

(72) Inventors: Weibin Dai, Shanghai (CN); Shuangshuang Li, Shanghai (CN); Jiang Cheng, Shanghai (CN)

(73) Assignee: MONTAGE TECHNOLOGY CO., LTD., Shanghai (CN)

(*) Notice: Subject to any disclaimer, the term of this patent is extended or adjusted under 35 U.S.C. 154(b) by 605 days.

(21) Appl. No.: 18/219,106

(22) Filed: Jul. 7, 2023

(65) Prior Publication Data

US 2024/0176640 A1 May 30, 2024

(30) Foreign Application Priority Data

Jul. 8, 2022 (CN) ......................... 202210815421.4

(51) Int. Cl.
*G06F 9/455* (2018.01)

(52) U.S. Cl.
CPC .................... *G06F 9/45558* (2013.01); *G06F 2009/45583* (2013.01)

(58) Field of Classification Search
None
See application file for complete search history.

(56) References Cited

U.S. PATENT DOCUMENTS

2019/0370043 A1* 12/2019 Olderdissen .......... G06F 3/0604

FOREIGN PATENT DOCUMENTS

WO WO-2017181853 A1 * 10/2017 ............... G06F 9/50

* cited by examiner

*Primary Examiner* — Bing Zhao
(74) *Attorney, Agent, or Firm* — IPRTOP LLC

(57) ABSTRACT

A method and apparatus for managing memory are provided. The method for managing memory includes: while a virtual machine is running, receiving, by a virtual machine memory management module, a memory allocation request sent by a user process in the virtual machine; sending, by the virtual machine memory management module according to the memory allocation request sent by the user process, the memory allocation request to a virtual PCIe device in a virtual machine manager to enable the virtual PCIe device to request memory from a host memory management module; and acquiring, by the virtual machine memory management module via the virtual PCIe device, a memory space allocated by the host memory management module and configuring the memory space to the user process. The method for managing memory can improve the efficiency of memory utilization.

9 Claims, 3 Drawing Sheets

VIRTUAL MACHINE MEMORY MANAGEMENT METHOD BASED ON VIRTUAL PCIe DEVICE

CROSS REFERENCE TO RELATED APPLICATION

The present application claims the benefit of priority to Chinese Patent Application No. CN 202210815421.4, entitled "METHOD AND APPARATUS FOR MANAGING MEMORY", filed with CNIPA on Jul. 8, 2022, the disclosure of which is incorporated herein by reference in its entirety for all purposes.

FIELD OF THE INVENTION

The present disclosure generally relates to virtual machines, and in particular to, a method and apparatus for managing memory.

BACKGROUND OF THE INVENTION

Virtualization technology is at the core of cloud-related applications. In a system where multiple virtual machines are deployed, these multiple virtual machines share physical resources of a single host, such as processors, memory, storage spaces, and network devices, which allows for the efficient sharing of the resources among multiple users, with each virtual machine representing an individualized portion of the available resources. As a result, multiple users can securely and flexibly access these resources while maintaining isolation from one another, greatly improving resource utilization.

In related technologies, static memory allocation and memory hot-plugging are mainly used to allocate host memory to virtual machines. In the static memory allocation scheme, the memory space allocated to a virtual machine is specified when the virtual machine is created, and the size of this memory space cannot be changed during the lifecycle of the virtual machine. Therefore, in order to meet the memory needs of the virtual machine as much as possible, users will configure a larger memory space for the virtual machine at the beginning, which may result in excessive and wasteful memory space. In the memory hot-plugging scheme, additional tools are usually required to participate, such as virtualization management software, so this scheme is not a self-contained solution and has poor flexibility.

Therefore, how to provide a self-contained solution that can dynamically allocate memory spaces while virtual machines are running has become one of the urgent technical problems to be solved by those skilled in the related art.

SUMMARY OF THE INVENTION

An objective of the present application is to provide a method and apparatus for managing memory, which can dynamically allocate memory spaces for virtual machines according to the needs thereof in the running process of the virtual machines without the use of external tools, and improve the efficiency of memory utilization.

The method for managing memory comprises: while a virtual machine is running, receiving, by a virtual machine memory management module, a memory allocation request sent by a user process in the virtual machine; sending, by the virtual machine memory management module according to the memory allocation request sent by the user process, the memory allocation request to a virtual PCIe device in a virtual machine manager to enable the virtual PCIe device to request memory from a host memory management module; and acquiring, by the virtual machine memory management module via the virtual PCIe device, a memory space allocated by the host memory management module and configuring the memory space to the user process.

In some embodiments, the virtual PCIe device comprises a first base address register and a second base address register, wherein the first base address register is used for communication between the virtual machine memory management module and the virtual machine manager, and the second base address register is used for mapping host memory spaces to memory spaces of the virtual machine.

In some embodiments, when the virtual machine is created, a size of the second base address register is specified and no physical memory space is allocated for the second base address register, thereby reserving a section of address space within the virtual machine so that the host memory spaces can be mapped to the section of address space in batches.

In some embodiments, acquiring, by the virtual machine memory management module via the virtual PCIe device, the memory space allocated by the host memory management module and configuring the memory space to the user process comprises: mapping, by the virtual machine memory management module via the virtual PCIe device, the memory space allocated by the host memory management module to the second base address register; and configuring, by the virtual machine memory management module via the second base address register, the memory space allocated by the host memory management module to the user process.

In some embodiments, the virtual machine manager is further used for sending notifications to the virtual machine memory management module after mapping the memory space allocated by the host memory management module to the second base address register.

In some embodiments, sending, by the virtual machine memory management module, the memory allocation request to the virtual PCIe device in the virtual machine manager comprises: writing, by the virtual machine memory management module, the memory allocation request to the first base address register to enable the virtual PCIe device to acquire, by reading the first base address register, the memory allocation request written by the virtual machine memory management module.

In some embodiments, before sending the memory allocation request to the virtual PCIe device in the virtual machine manager, the method for managing memory further comprises: determining, by the virtual machine memory management module according to the memory allocation request sent by the user process, whether a local memory pool of the virtual machine has enough local memory spaces to accommodate the user process; if the local memory pool of the virtual machine has enough local memory spaces to accommodate the user process, configuring, by the virtual machine memory management module, a local memory space in the local memory pool of the virtual machine to the user process, otherwise, sending the memory allocation request to the virtual PCIe device in the virtual machine manager.

In some embodiments, the method for managing memory further comprises: receiving, by the virtual machine memory management module, a memory release request sent by the user process; and releasing, by the virtual machine memory management module according to the memory release request, the local memory space configured to the user process to the local memory pool of the virtual machine.

In some embodiments, the method for managing memory further comprises: releasing the local memory spaces in the local memory pool of the virtual machine to the host memory management module when the virtual machine memory management module is unloaded or when the virtual machine exits.

In some embodiments, the memory space allocated by the host memory management module comprises at least part of a heterogeneous memory.

The present disclosure further provides an apparatus for managing memory, which comprises: at least one virtual machine memory management module, at least one virtual machine manager, a virtual PCIe device integrated in the virtual machine manager, and a host memory management module, wherein the virtual machine memory management module and the virtual machine manager both correspond to a virtual machine, wherein when the virtual machine is running, the virtual machine memory management module, receives a memory allocation request sent by a user process in the virtual machine, sends, according to the memory allocation request sent by the user process, the memory allocation request to the virtual PCIe device in the virtual machine manager to enable the virtual PCIe device to request memory from the host memory management module, and configures the memory space to the user process after acquiring, via the virtual PCIe device, the memory space allocated by the host memory management module.

DETAILED DESCRIPTION

The present disclosure will be described below through exemplary embodiments. Those skilled in the art can easily understand other advantages and effects of the present disclosure according to contents disclosed by the specification. The present disclosure may also be implemented or applied through other different exemplary embodiments. Various modifications or changes may also be made to all details in the specification based on different points of view and applications without departing from the spirit of the present disclosure. It needs to be stated that the following embodiments and the features in the embodiments may be combined if no conflict will result.

It should be noted that the drawings provided in this disclosure only illustrate the basic concept of the present disclosure in a schematic way, so the drawings only show the components closely related to the present disclosure. The drawings are not necessarily drawn according to the number, shape, and size of the components in actual implementation; during the actual implementation, the type, quantity, and proportion of each component may be changed as needed, and the layout of the components may also be more complicated.

In addition, in this document, relationship terms such as “first”, “second”, etc. are used only to distinguish one entity or operation from another, and do not necessarily require or imply any such actual relationship or sequence between these entities or operations.

In the technical field of virtual machines, the resources of a host are usually shared among multiple virtual machines, and it is difficult to evaluate the memory usage status of each virtual machine in advance. Therefore, how to provide a self-inclusive solution that can dynamically allocate the memory while the virtual machine is running has become one of the urgent technical problems to be solved by those skilled in the related art.

At least for the above problem, the present disclosure provides a method for managing memory. In the following, specific implementations of the present disclosure will be described by exemplary embodiments with reference to the accompanying drawings.

Figure 1A:
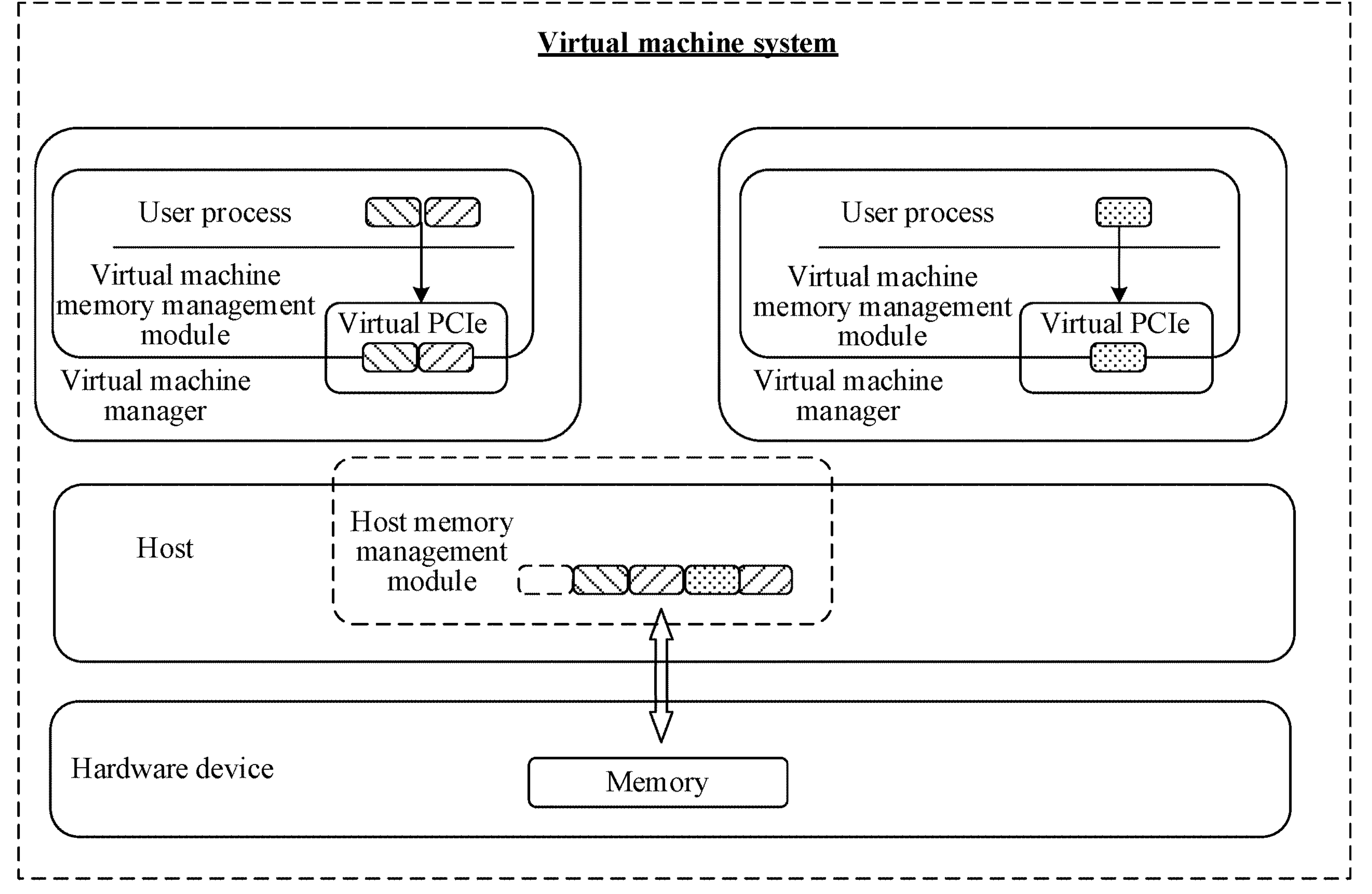
FIG. 1A is an architectural diagram of a virtual machine system in an embodiment of the present disclosure.

FIG. 1A shows a structural diagram of a virtual machine system in an embodiment of the present disclosure. As shown in FIG. 1A, the virtual machine system described of the present disclosure comprises a host (including, e.g., a host memory driver), at least one virtual machine manager (e.g., a quick emulator, such as QEMU), a virtual Peripheral-Component-Interconnect-express (PCIe) device integrated in the virtual machine manager, and at least one virtual machine memory management module. The virtual machine manager and the virtual machine memory management module are consistent with virtual machines in number. Each virtual machine corresponds to one virtual machine manager and one virtual machine memory management module, and FIG. 1A exemplarily illustrates a virtual machine system comprising two virtual machines. The number of the virtual machines may be adjusted as needed in actual applications. The virtual machine memory management module is used for managing memory of the virtual machine, and the host comprises a host memory management module, which is used for managing memory of the host. In some embodiments, one or more hardware devices for providing a heterogeneous memory may be connected to the host as needed (as shown in FIG. 1A).

Figure 1B:
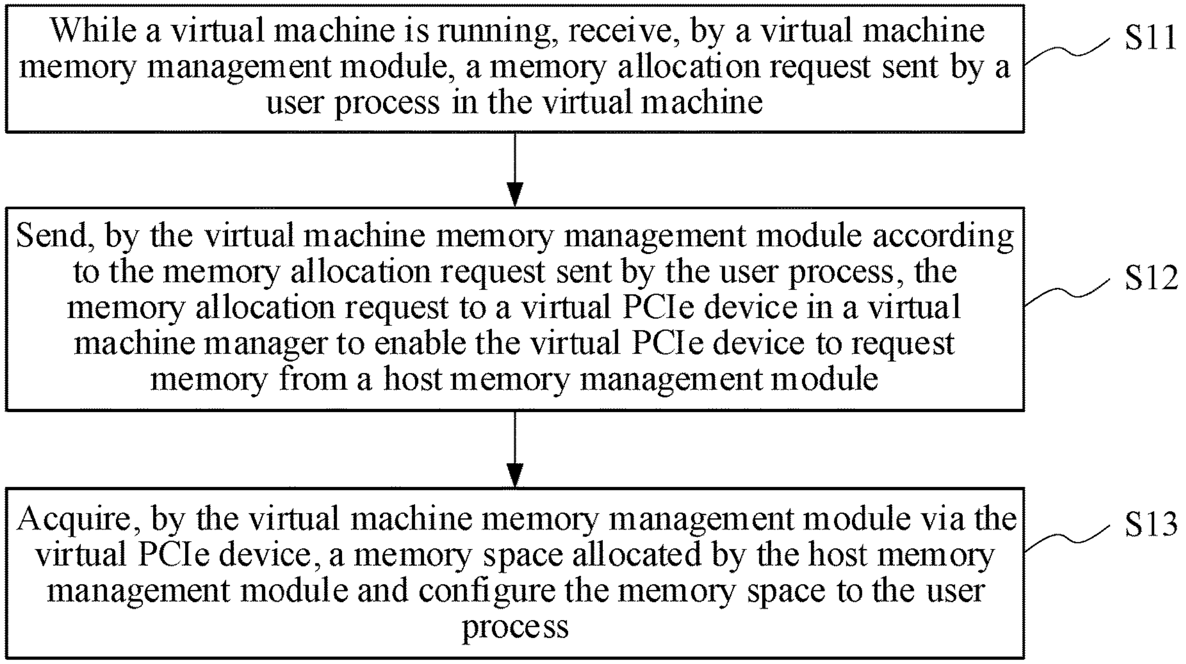
FIG. 1B is a flowchart of a method for managing memory in an embodiment of the present disclosure.

FIG. 1B is a flowchart of a method for managing memory in an embodiment of the present disclosure. As shown in FIG. 1B, the method for managing memory in one embodiment of the present disclosure comprises steps S11-S13 as described below.

Step S11 comprises: while a virtual machine is running, receiving, by a virtual machine memory management module, a memory allocation request sent by a user process in the virtual machine. The user process may, for example, send the memory allocation request to the virtual machine memory management module using a mmap( ) function.

Step S12 comprises: sending, by the virtual machine memory management module according to the memory allocation request sent by the user process, the memory allocation request to a virtual PCIe device in a virtual machine manager to enable the virtual PCIe device to request memory from a host memory management module.

Specifically, the virtual machine memory management module, upon receiving the memory allocation request from the user process, may communicate with the virtual PCIe device via a virtual PCIe interface, i.e., the memory allocation request is sent to the virtual PCIe device. The virtual PCIe device, after receiving the memory allocation request sent by the virtual memory management module, requests memory from the host memory management module. In some embodiments, the virtual PCIe device may request memory from the host memory management module via the mmap( ) function.

Step S13 comprises: acquiring, by the virtual machine memory management module via the virtual PCIe device, a memory space allocated by the host memory management module and configuring the memory space to the user process.

According to the above description, it can be seen that the method for managing memory provided by the present disclosure can configure a memory space for the virtual machine according to actual memory demands of the user process while the virtual machine is running, thus achieving dynamic memory allocation, which is conducive to improving efficiency of memory utilization. In addition, in the present disclosure, the memory allocation request is triggered by the user process in the virtual machine, eliminating the need for external virtualization management software, thus the method for managing memory of the present disclosure is a self-contained solution and can be flexibly deployed.

In some embodiments, the virtual PCIe device comprises a first base address register BAR0 and a second base address register BAR2. The first base address register BAR0 is used for storing control registers to provide a communication channel between the virtual machine memory management module and the virtual machine manager, thereby achieving communication between the virtual machine memory management module and the virtual machine manager. The second base address register BAR2 is used for mapping from host memory spaces to memory spaces of the virtual machine, i.e., the host memory spaces may be allocated to the virtual machine through the second base address register BAR2.

In some embodiments, the first base address register BAR0 may be a 32 bit base address register and the second base address register BAR2 may be a 64 bit base address register.

In some embodiments, when the virtual machine is created, the size of the second base address register BAR2 is specified at the same time and no physical memory space needs to be allocated for the second base address register BAR2; the existence of the second base address register BAR2 reserves a section of address space within the virtual machine so that the host memory spaces can be mapped to the section of address space in batches.

In some embodiments, the operation of sending, by the virtual machine memory management module, a memory allocation request to the virtual machine manager, may be implemented through the first base address register BAR0. Specifically, the virtual machine memory management module may write the memory allocation request to the first base address register BAR0, and the virtual machine manager may acquire the memory allocation request by reading the first base address register BAR0.

In some embodiments, the virtual PCIe device in the virtual machine manager, upon receiving the memory allocation request sent by the virtual machine memory management module, may send the memory allocation request to the host memory management module via the mmap( ) function provided by a device file (e.g., /dev/mdev) node, and map the allocated memory space to the second base address register BAR2 of the virtual PCIe device. The size of the mapped memory is specified by the virtual machine memory management module that sends the memory allocation request. After the virtual machine manager completes the memory mapping, it notifies the virtual machine memory management module of the completion.

Figure 2:
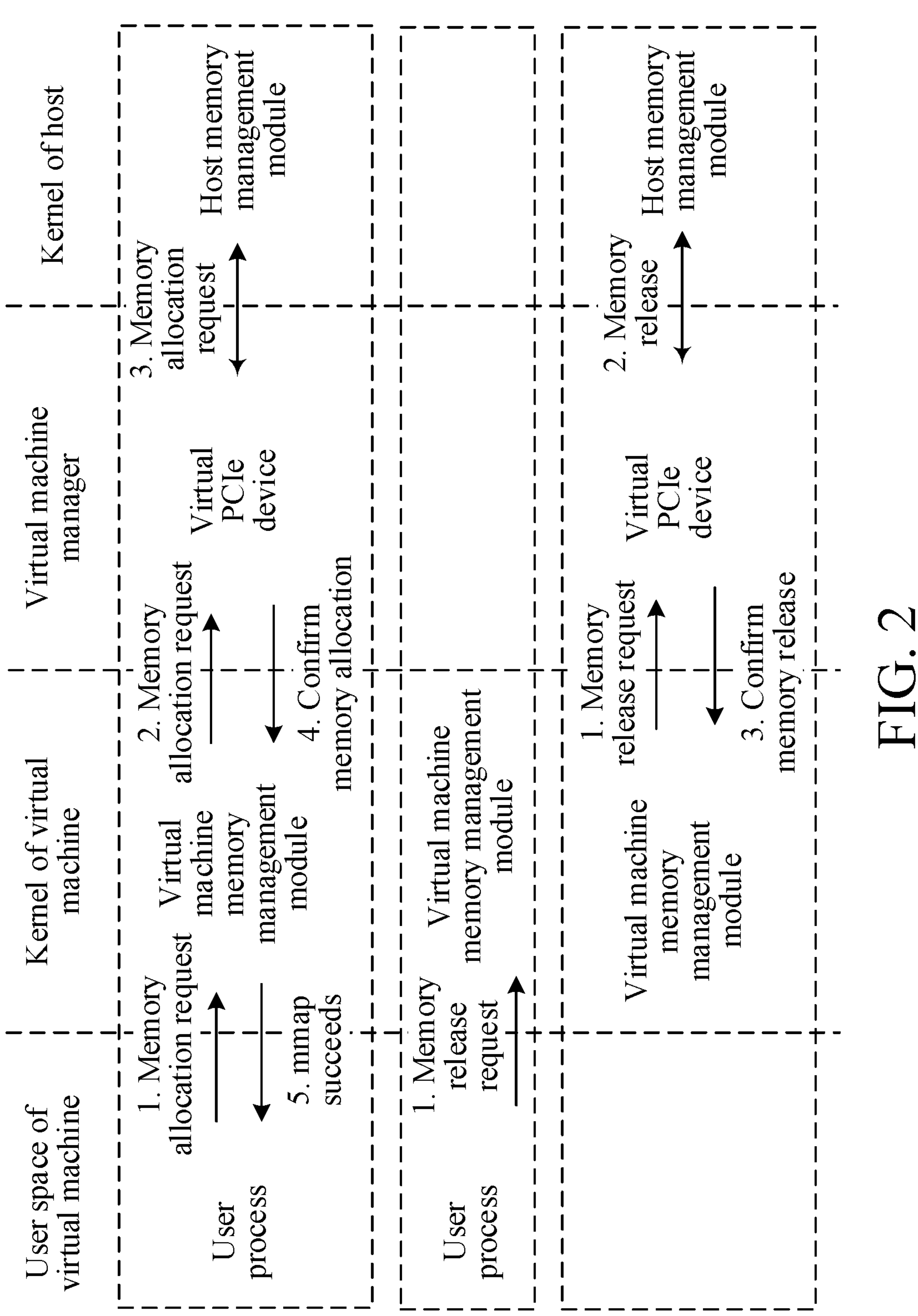
FIG. 2 is a flowchart illustrating requesting and releasing memory spaces in an embodiment of the present disclosure.

As shown in FIG. 2, the virtual machine memory management module of the present disclosure acquires, via the virtual PCIe device, a memory space allocated by the host memory management module and configures the memory space to the user process. Some details of the above operation are as follows:

1. The user process sends a memory allocation request to the virtual machine memory management module. The user process in the virtual machine may request memory from the virtual machine memory management module within the virtual machine via a mmap( ) function.
2. After receiving the memory allocation request, the virtual machine memory management module sends the memory allocation request to the virtual PCIe device in the virtual machine manager. The virtual machine memory management module may implement information interaction with the virtual machine manager through the first base address register BAR0.
3. After receiving the memory allocation request, the virtual PCIe device requests memory from the host memory management module. The virtual PCIe device may request memory from the host memory management module through a mmap( ) function.
4. The host memory management module allocates a memory space according to the request of the virtual PCIe device and returns the allocated memory space to the virtual machine memory management module via the virtual PCIe device. The virtual PCIe device invokes virtual-machine-manager-related functions (e.g., QMEU memory functions) to map the allocated memory space to the second base address register BAR2, and in this way, the allocated memory space can be made visible inside the virtual machine.
5. The virtual machine memory management module notifies the user process of successful memory allocation.

It is to be noted that in some embodiments, when the user process in the virtual machine requests memory from the virtual machine memory management module via a mmap( ) function, the virtual machine memory management module first accesses a local memory pool; if there are enough local memory spaces in the local memory pool to accommodate the user process, the virtual machine memory management module allocates a local memory space to the user process directly from the local memory pool. If the local memory pool does not have enough local memory spaces, the virtual machine memory management module will send the memory allocation request to the virtual PCIe device in the virtual machine manager to request memory from the host memory management module through the virtual PCIe device. This two-step arrangement helps to improve efficiency of memory allocation.

Still referring to FIG. 2, in the present disclosure, memory release happens in the following two scenarios:

In a first scenario, the user in the virtual machine releases memory spaces. For example, the user process in the virtual machine will send a memory release request to the virtual machine memory management module when exiting or calling an unmap( ) function to release memory spaces.

In this case, the virtual machine memory management module will, according to the memory release request, release the local memory space configured to the user process to the local memory pool of the virtual machine instead of releasing it to the host memory management module, which helps to reduce the performance loss of the associated device caused by frequent memory allocation and release, and also helps to improve the efficiency.

In a second scenario, the virtual machine memory management module releases memory spaces. For example, a memory release request is sent to the virtual PCIe device when the virtual machine memory management module is unloaded or the virtual machine exits, and the local memory spaces in the local memory pool of the virtual machine are released, via the virtual PCIe device, to the host memory management module. Upon completion of the release, the virtual PCIe device sends a confirmation message to the virtual machine memory management module.

In some embodiments, the memory space allocated by the host memory management module comprises at least part of a heterogeneous memory, and in this way, virtualization of heterogeneous memory of the host can be achieved.

The present disclosure further provides an apparatus for managing memory, comprising: at least one virtual machine memory management module, at least one virtual machine manager, a virtual PCIe device integrated in the virtual machine manager, and a host memory management module, wherein the virtual machine memory management module and the virtual machine manager both correspond to a virtual machine, wherein when the virtual machine is running, the virtual machine memory management module, receives a memory allocation request sent by a user process in the virtual machine, sends, according to the memory allocation request sent by the user process, the memory allocation request to the virtual PCIe device in the virtual machine manager to enable the virtual PCIe device to request memory from the host memory management module, and configures a memory space to the user process after acquiring, via the virtual PCIe device, the memory space allocated by the host memory management module.

In summary, the method and apparatus for managing memory described in one or more embodiments of the present disclosure have the following beneficial effects:

- based on the method for managing memory, the memory of the host can be dynamically shared among the multiple virtual machines, and each virtual machine can request the memory of the host according to the actual demand in the running process, thus there is no excessive pre-allocation of the memory, which is conducive to improving the using efficiency of the memory;
- in addition, the method for managing memory is a self-inclusive dynamic memory allocation solution where memory allocation is triggered by the internal process of the virtual machine, thus eliminating the need for external virtualization management software, making the deployment of applications more flexible.

Therefore, the present disclosure effectively overcomes various shortcomings of the prior art and has a high industrial value.

The above-mentioned embodiments only exemplarily illustrate the principles and effects of the present disclosure, but are not used to limit the present disclosure. Any person skilled in the art may modify or change the above embodiments without violating the spirit and scope of the present disclosure. Therefore, all equivalent modifications or changes made by those skilled in the art without departing from the spirit and technical concepts disclosed by the present disclosure should still be covered by the attached claims of the present disclosure.

What is claimed is:

1. A method for managing memory in a virtual machine system, the system comprising:

at least one virtual machine manager;

a virtual Peripheral-Component-Interconnect-express (PCIe) device integrated in each virtual machine manager; and at least one virtual machine memory management module, wherein each virtual machine corresponds to one of the at least one virtual machine memory management module and one of the at least one virtual machine manager;

the method comprising:

while the virtual machine is running, receiving, by the virtual machine memory management module, a memory allocation request sent by a user process in the virtual machine;

sending, by the virtual machine memory management module according to the memory allocation request sent by the user process, the memory allocation request to the virtual PCIe device in the virtual machine manager to enable the virtual PCIe device to request memory from a host memory management module; wherein the host memory management module is implemented in a host and configured for managing memory of the host; wherein the virtual PCIe device comprises a first base address register and a second base address register, wherein the first base address register is used for communication between the virtual machine memory management module and the virtual machine manager, and the second base address register is used for mapping host memory spaces to memory spaces of the virtual machine; and acquiring, by the virtual machine memory management module via the virtual PCIe device, a host memory space allocated by the host memory management module and configuring the host memory space to the user process.

2. The method for managing memory as in claim 1, wherein when the virtual machine is created, a size of the second base address register is specified and no physical memory space is allocated for the second base address register, thereby reserving a section of address space within the virtual machine so that the host memory spaces can be mapped to the section of address space in batches.

3. The method for managing memory as in claim 1, wherein acquiring, by the virtual machine memory management module via the virtual PCIe device, the host memory space allocated by the host memory management module and configuring the host memory space to the user process comprises:

mapping, by the virtual machine memory management module via the virtual PCIe device, the host memory space allocated by the host memory management module to the second base address register; and configuring, by the virtual machine memory management module via the second base address register, the host memory space allocated by the host memory management module to the user process.

4. The method for managing memory as in claim 3, wherein the virtual machine manager is further used for sending notifications to the virtual machine memory management module after mapping the host memory space allocated by the host memory management module to the second base address register.

5. The method for managing memory as in claim 1, wherein sending, by the virtual machine memory management module, the memory allocation request to the virtual PCIe device in the virtual machine manager, comprises:

writing, by the virtual machine memory management module, the memory allocation request to the first base address register to enable the virtual PCIe device to acquire, by reading the first base address register, the memory allocation request written by the virtual machine memory management module.

6. The method for managing memory as in claim 1, wherein before sending the memory allocation request to the virtual PCIe device in the virtual machine manager, the method for managing memory further comprises:

determining, by the virtual machine memory management module according to the memory allocation request sent by the user process, whether a local memory pool of the virtual machine has enough local memory spaces to accommodate the user process; and if the local memory pool of the virtual machine has enough local memory spaces to accommodate the user process, configuring, by the virtual machine memory management module, a local memory space in the local memory pool of the virtual machine to the user process, otherwise, sending the memory allocation request to the virtual PCIe device in the virtual machine manager.

7. The method for managing memory as in claim 6, further comprising:

receiving, by the virtual machine memory management module, a memory release request sent by the user process; and releasing, by the virtual machine memory management module according to the memory release request, the local memory space configured to the user process to the local memory pool of the virtual machine.

8. The method for managing memory as in claim 6, further comprising:

releasing the local memory spaces of the local memory pool of the virtual machine to the host memory management module when the virtual machine memory management module is unloaded or when the virtual machine exits.

9. The method for managing memory as in claim 1, wherein the host memory space allocated by the host memory management module comprises at least part of a heterogeneous memory.

* * * * *